Patented Dec. 30, 1930

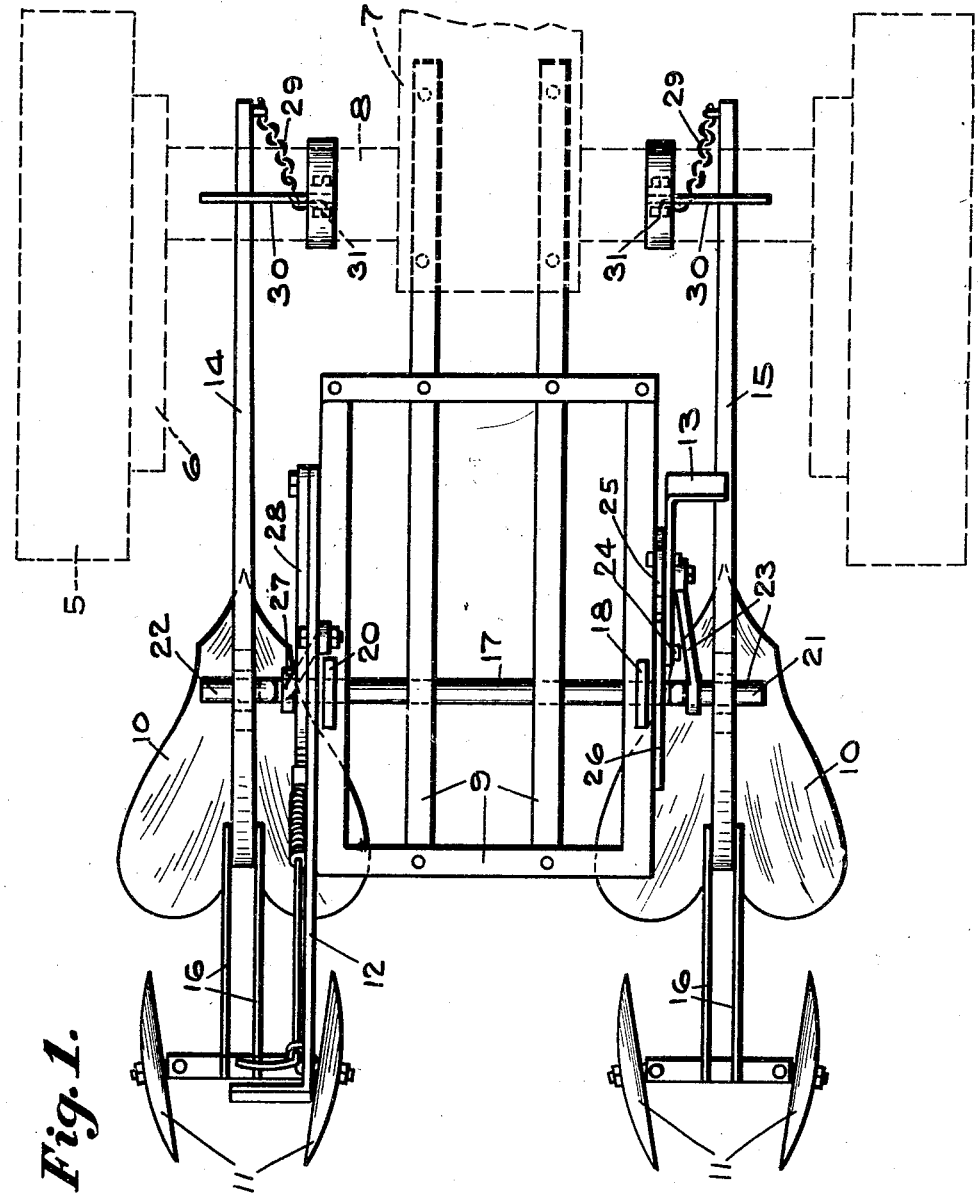

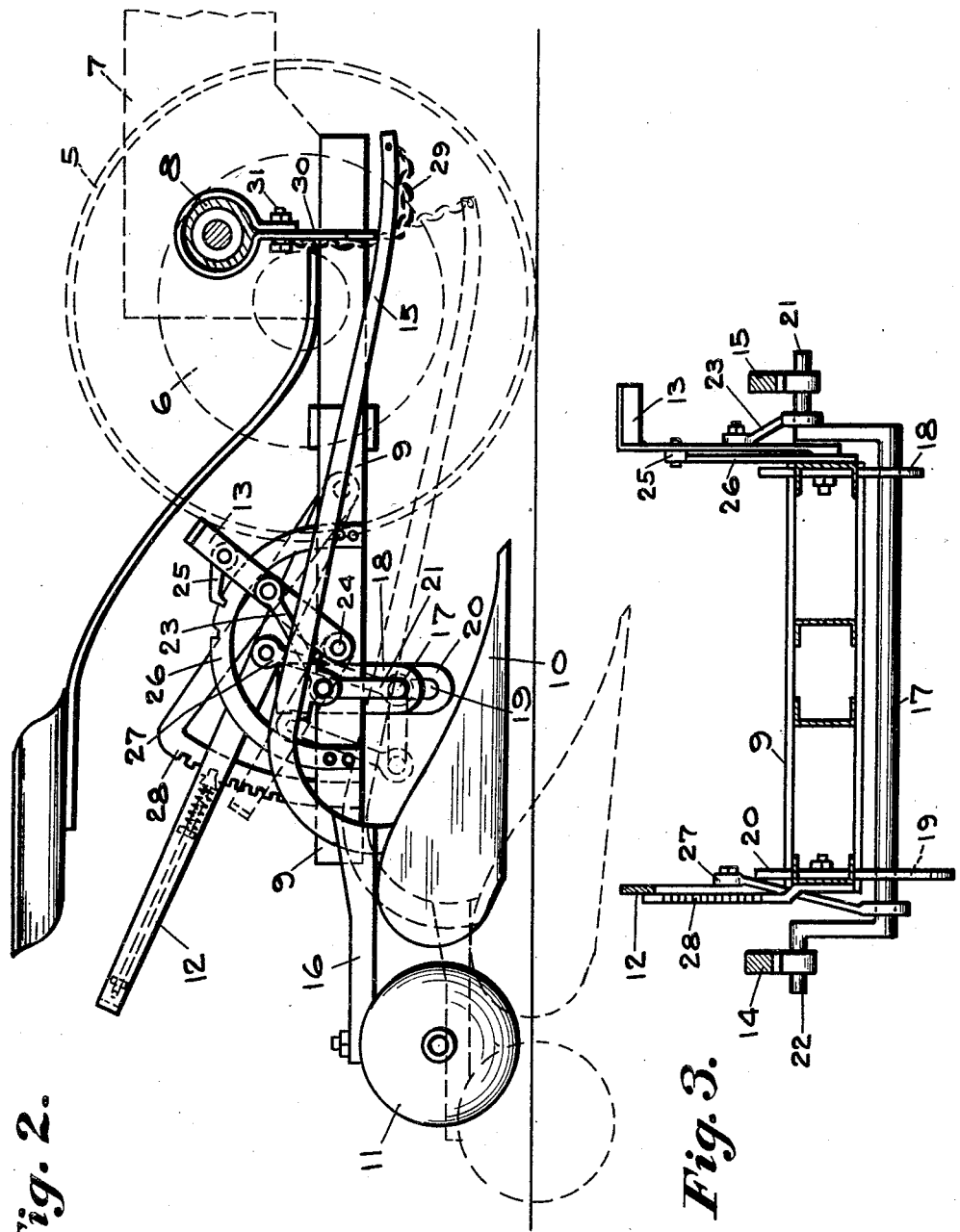

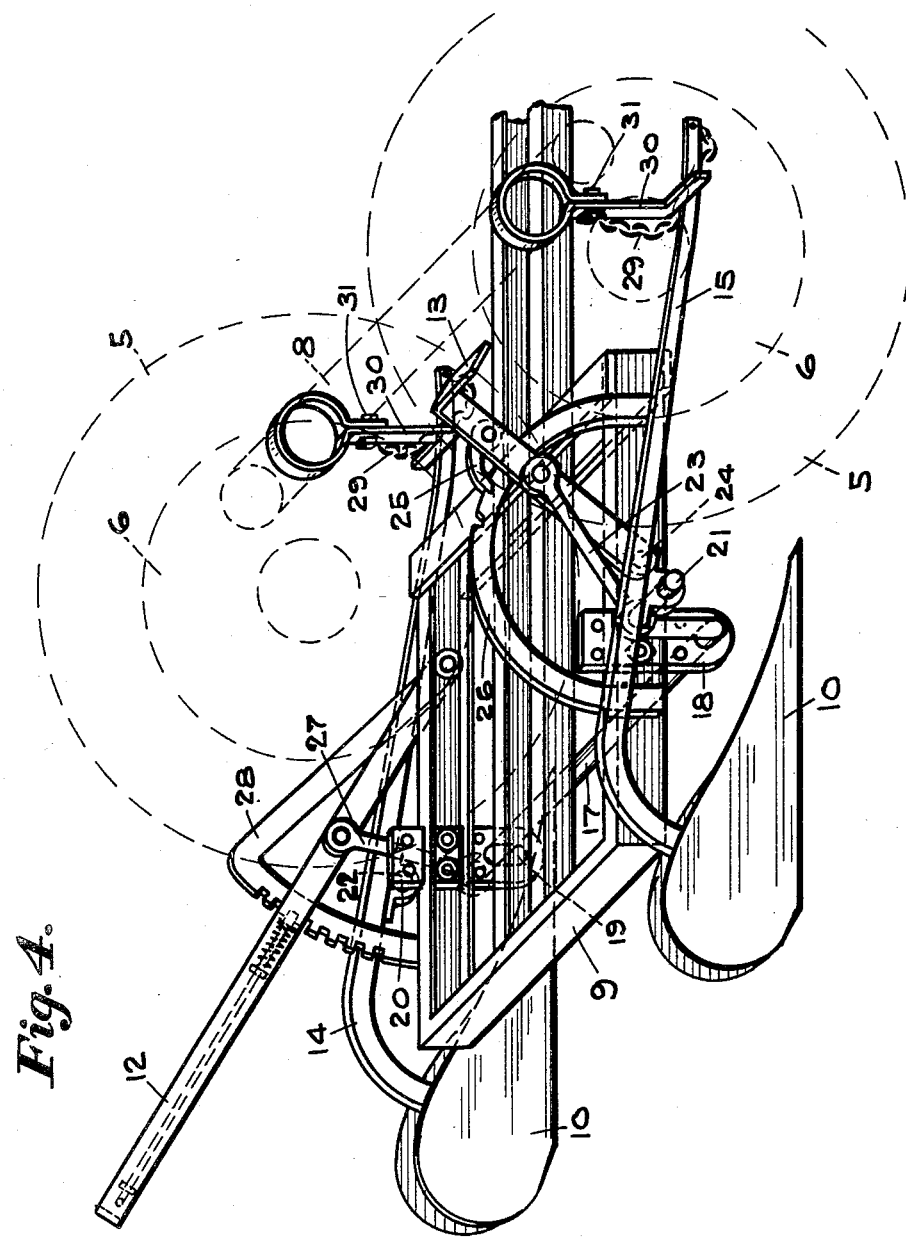

1,786,591

UNITED STATES PATENT OFFICE

WILLIAM M. ANDERSON, OF BROWNVILLE, NEBRASKA, ASSIGNOR OF ONE-HALF TO ARCH HOSTERMAN, OF BROWNVILLE, NEBRASKA

LISTER ATTACHMENT FOR TRACTORS

Application filed August 19, 1929. Serial No. 386,799.

This invention relates to attachments for listers, and particularly for listers drawn by "wide tread" tractors. In the use of tractors for drawing listers, the lister is generally secured to the axle housing and is disposed rearwardly of the axle between the tractor wheels. In that class of tractors designated as "wide tread" the tractor wheels are spaced apart an adequate distance to permit operation of a lister therebetween, and these tractors are in general use by farmers for drawing listers.

One of the objects of the invention is to provide attachments which will release accumulations from the discs and plows. While cultivating a field, weeds and stubble often are caught by the plows and discs and these obstructions frequently prevent operation unless manually removed. By use of the herein described attachments this manual work may be avoided.

Another object of the invention is to provide attachments which may be conveniently operated by the driver for lifting the plows and discs while driving over obstructions, corn-rows or ditches, and for elevating the discs and plows when "turning about" at the end of a field.

Still another object is to provide attachments which will maintain the plows and discs at predetermined depths in the ground during operation.

The invention includes attachments which may be applied to listers generally at a moderate expense or may be installed at the factory, and the attachments consist of few and simple parts which may be economically and conveniently manufactured.

With the foregoing objects in view and others to be mentioned the invention presents a new and useful construction, combination and arrangement of parts as described herein and claimed and as illustrated in the accompanying drawings, it being understood that changes may be made in form, size, proportion of parts and minor details, said changes being within the scope of the invention as claimed.

In the drawings, Fig. 1 is a plan view of a lister provided with the attachments, the driver's seat for the tractor being omitted. Fig. 2 is a side view of the same, the plows and discs being supported in an elevated position. Fig. 3 is a rear view of the lister frame, the lister beams and part of the frame being in transverse section. Fig. 4 is a perspective view to clearly show operating parts, the discs being omitted.

Referring now to the drawing for a more particular description, the invention is shown and described in connection with certain well known parts of a tractor illustrated by dotted lines, such as the tractor-wheels 5, the gear-casings 6, differential gear-casing 7 and housing 8 of the power shaft. Also the invention is shown and described in connection with certain well known parts of a lister, such as the frame 9 which is rigidly secured to the bottom of the gear casing 7 as best shown in Fig. 2 of the drawings, the earth engaging elements of the lister being the plows 10 and discs 11.

Since the frame 9 is rigidly mounted on the tractor it may be depended upon as a support for resisting stresses directed thereto by use of a hand-lever 12 and a foot-lever 13, the lever 12 being used for moving the lister-beam 14 and the foot-lever 13 being used for simultaneously moving the lister-beams 14 and 15. Numerals 16 indicate extensions upon which the discs 11 are mounted, said extensions projecting rearwardly from and being rigidly mounted on the beams 14 and 15.

It will be seen that the advantages to be derived by use of the invention relate particularly to the mounting and control of the beams 14 and 15.

Numeral 17 indicates a crank shaft, one of its ends being journalled in a bracket 18 which is secured to the frame 9, the opposite end of the shaft being disposed in a slot 19 of a bracket 20 which is also secured to said frame, and as best shown in Fig. 3 of the drawings a crank-arm 21 of said shaft is pivotally connected with the beam 15, the crank-arm 22 of said shaft being pivotally connected with the beam 14.

Numeral 23 indicates a strap which is pivotally mounted at its ends and, in operation, if the foot-lever is swung forwardly on its pivotal mounting 24 the crank-arms 21, and 22 together with the lister-beams 14 and 15 will be elevated, and when elevated the pawl 25 may engage in a notch of the sector 26 for maintaining the plows and discs in said elevated position, and for operation, when cultivating, the pawl 25 is released from the sector 26.

The hand-lever is used only in instances when it is desired to change the inclination of the crank shaft, and this is an important feature since in some instances the "near" tractor wheel travels on hard, unploughed ground and the "off" tractor wheel will be disposed somewhat lower than said "near" wheel. Therefore, in order that plows and discs on the respective beams 14 and 15 may enter the ground to similar depths the lever 12 may be swung rearwardly to cause the crank shaft to move downwardly in the slot 19 of the bracket 20, a strap 27 being employed for pivotally connecting said hand-lever with the crank shaft.

Numeral 28 indicates a sector and by use of a pawl the hand-lever may be used for disposing the crank shaft at required inclinations to permit the plows and discs to enter the ground at uniform depths.

During operation, when both tractor wheels travel on level ground the hand-lever 12 is not used.

In order that the plows and discs may be suitably maintained in the ground during operation, and that they may be maintained in an elevated position whenever desired, the front ends of the beams 14 and 15 are flexibly connected with the tractor so that these ends of the beams may automatically move upwardly or downwardly, any suitable means being employed for this purpose, as a pair of chains 29. Numerals 30 indicate a pair of detents or angular buffer-bars which are stationary with the tractor.

The buffer-bars 30 may be secured to the tractor by any suitable means, and as shown, the upper end-portions of these bars encircle the housing 8 of the power-shaft of the tractor and extend downwardly therefrom to terminate adjacent to and above the front ends of the lister-beams 14 and 15.

The flexible connection for the front ends of these lister-beams is a matter of importance. Subject to the control of the levers 12 and 13 the beams 14 and 15 may swing from the crank-arms. When the plows and discs enter the ground the front ends of the lister-beams, according to the present construction will swing downwardly and the plows will enter the ground almost immediately instead of sliding upon the surface of the ground. The chains may be adjusted by the use of pins 31 for controlling the downward swinging movements of the ends of the lister-bars for deep or shallow cultivation.

When "turning about" at the end of a field the tractor should be moved rearwardly so that the plows and discs will be disposed in loose ground. The foot-lever 13 is then used for swinging the plows and discs upwardly free from the ground, and after the tractor has been "turned about" the pawl 25 is released from the sector 26 and the plows and discs quickly enter the ground.

When the plows and discs move from the ground to the position shown in solid lines in Fig. 2 of the drawings, the front ends of the beams 14 and 15 will swing upwardly into engagement with the angular buffer-bars 30.

It will be seen that the crank shaft, for the rocking movements of its arms, is journalled near one of its ends in a bracket, said shaft, near its opposite end engaging in the vertical slot of the other bracket. During operation, when it is desired to maintain the crank shaft in a horizontal position relative to the frame 9, the hand-lever 12 is used and an adjustment is made with its sector so that the plows and discs at the respective sides of the frame 9 will enter the ground at uniform distances, and thereafter no adjustment of the hand-lever 12 with its sector will be required except when the tractor is driven with its "near" wheel moving upon hard or unploughed ground as heretofore described.

It will be appreciated that the parts required for the herein described lister attachments are few and simple, and therefore they may be produced at a limited expense; and on account of the operation of the parts, as explained, said attachments prove to be of great advantage and the usefulness of the lister greatly increased.

I claim as my invention,—

1. In lister attachments for a tractor, buffer-bars secured to and projecting below a part of the tractor, a frame rigidly secured to the tractor, a crank shaft journalled to permit rocking movements of its arms at the sides of the frame, a pair of lister-beams provided with ground-engaging elements, each beam being journalled on an arm of the crank shaft and disposed with one of its ends below a buffer-bar, and a pair of chains connecting the beams with said buffer-bars.

2. In lister attachments for a tractor, buffer-bars secured to the tractor, a frame extending rearwardly from and secured to the tractor, a journaled crank shaft having arms disposed at the sides of the frame, lister-beams provided with earth-engaging elements, each beam being mounted on an arm of the crank shaft and having a part disposed beneath a buffer-bar, and a lever connected with an arm of the crank-shaft and arranged to swing from the frame to cause engagement of said beams with the buffer-bars.

3. In lister attachments for a tractor, a frame rigidly secured to the tractor and extending rearwardly therefrom, buffer-bars secured to and extending below a part of the tractor, a crank shaft journalled in the frame, lister-beams disposed approximately parallel with the line of travel of the tractor and journalled on the arms of the tractor, ground engaging elements on the rear ends of the lister-beams, and flexible elements arranged to be adjusted longitudinally of the buffer-bars and secured to the front ends of the lister-beams.

4. In lister attachments for a tractor, a frame rigidly secured to and extending rearwardly from a tractor, a crank shaft mounted in the frame to permit rocking movements of its arms, a pair of lister beams disposed at the sides of the frame with their front ends disposed beneath a part of the tractor, each being journalled between its ends upon an arm of the crank shaft, ground engaging elements on the rear ends of the lister-beams, and flexible elements connecting the lister-beams with said tractor.

5. In lister attachments for a tractor, flexible elements connected with and depending from the tractor, a frame extending rearwardly from and rigidly secured to the tractor, a crank shaft journalled in the frame, a pair of lister-beams each journalled between its ends on an arm of the crank shaft and connected at its front end with a flexible element, ground-engaging elements on its rear ends of said beams, and levers connected with the arms of the crank shaft and arranged to swing from the frame for moving the lister-beams.

In testimony whereof, I have affixed my signature.

WILLIAM M. ANDERSON.